(12) United States Patent
Rusch

(10) Patent No.: US 10,323,778 B2
(45) Date of Patent: Jun. 18, 2019

(54) FULL FLOW PIPE CONNECTOR

(71) Applicant: National Diversified Sales, Inc., Fresno, CA (US)

(72) Inventor: David Rusch, Springville, CA (US)

(73) Assignee: NATIONAL DIVERSIFIED SALES, INC., Fresno, CA (US)

( * ) Notice: Subject to any disclaimer, the term of this patent is extended or adjusted under 35 U.S.C. 154(b) by 314 days.

(21) Appl. No.: 15/189,770

(22) Filed: Jun. 22, 2016

(65) Prior Publication Data
US 2017/0370506 A1 Dec. 28, 2017

(51) Int. Cl.
*F16L 23/00* (2006.01)
*F16L 37/248* (2006.01)

(52) U.S. Cl.
CPC ............ *F16L 23/00* (2013.01); *F16L 37/248* (2013.01)

(58) Field of Classification Search
CPC ... F16L 23/00; E04D 13/1476; E04D 13/1407
USPC ........................................ 285/3, 4, 405, 141
See application file for complete search history.

(56) References Cited

U.S. PATENT DOCUMENTS

| | | | | |
|---|---|---|---|---|
| 3,004,776 A | * | 10/1961 | Sebardt | F16L 15/008 285/212 |
| 3,602,530 A | * | 8/1971 | Elwart | E04D 13/1471 285/4 |
| 3,866,950 A | * | 2/1975 | Skoch | F16L 21/002 285/136.1 |
| 4,157,194 A | * | 6/1979 | Takahashi | B29C 47/0023 285/3 |
| 4,318,547 A | * | 3/1982 | Ericson | F16L 25/14 277/607 |
| 4,563,847 A | * | 1/1986 | Hasty | E04D 13/1476 285/4 |
| 4,717,178 A | * | 1/1988 | Daghe | E03B 9/04 285/4 |
| 4,832,375 A | * | 5/1989 | Emberson | E03F 5/0407 285/12 |
| 4,925,216 A | * | 5/1990 | Steer | A61F 5/4404 285/200 |
| 5,141,255 A | * | 8/1992 | Hanaoka | B05B 15/65 285/4 |
| 5,145,213 A | * | 9/1992 | Marrison | F16L 35/00 285/2 |
| 5,398,973 A | * | 3/1995 | McAtamney | F16L 39/00 285/123.14 |
| 6,353,184 B1 | * | 3/2002 | Daoud | F16L 5/02 16/2.1 |
| 7,121,557 B2 | * | 10/2006 | Christie | F16J 15/025 277/606 |

(Continued)

*Primary Examiner* — Aaron M Dunwoody
(74) *Attorney, Agent, or Firm* — David J. Pitman; Fulwider Patton LLP

(57) ABSTRACT

A pipe connector for use in conjunction with a catch basin, the pipe connector having an annular flange defining a central bore and a major pipe receptor in the form of a tube having a first diameter and being attached to the flange and a minor pipe receptor in the form of a tube has a second diameter smaller than the first diameter, and is attached to the major pipe receptor by a frangible bridge that is configured to cleanly break upon the application of an impact to the minor pipe receptor, whereby the minor pipe receptor is removable from the major pipe receptor.

11 Claims, 8 Drawing Sheets

(56) References Cited

U.S. PATENT DOCUMENTS

2003/0098081 A1\* 5/2003 Tarr ..................... F16L 55/115
138/96 R
2008/0277918 A1\* 11/2008 Andersen ................. F16L 5/00
285/4

\* cited by examiner

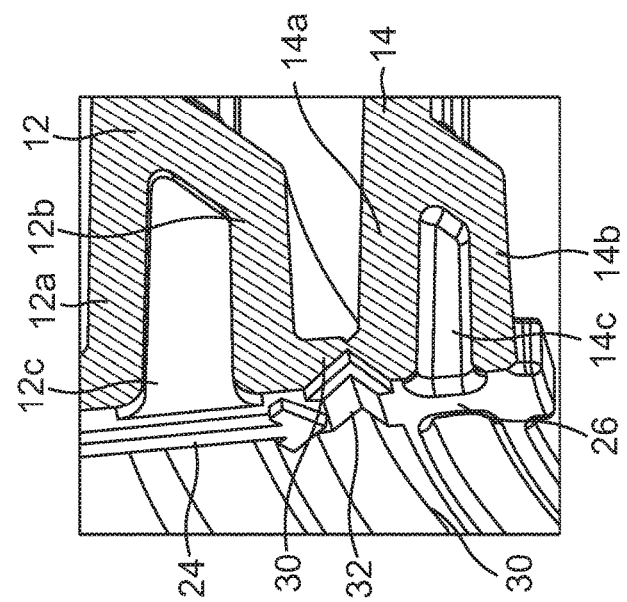
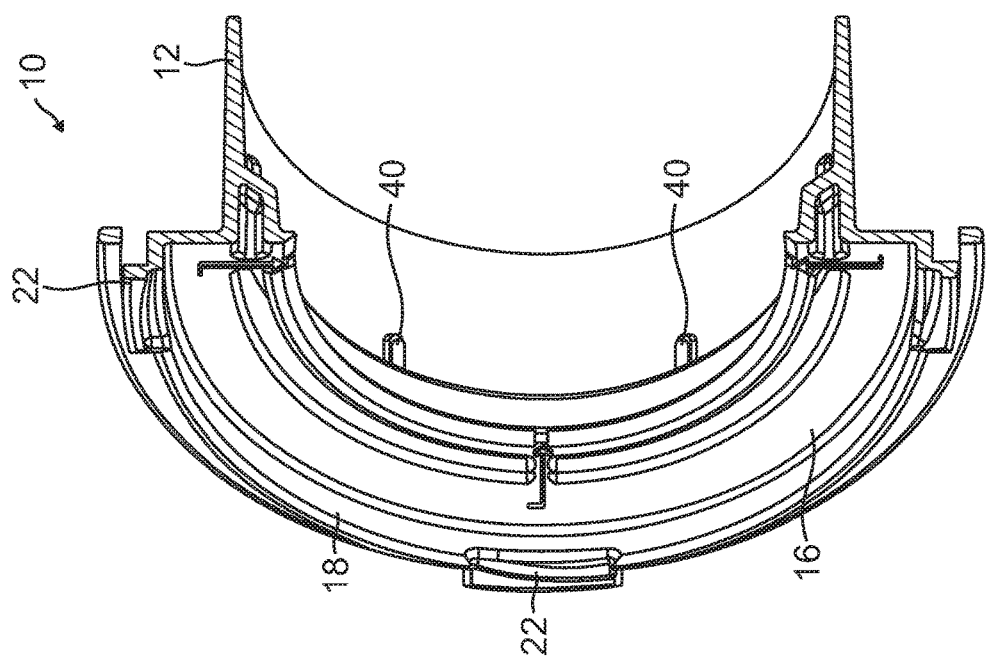

FULL FLOW PIPE CONNECTOR

BACKGROUND

This application relates to systems and methods for connecting pipes to fluid drainage basins, or to each other. Specifically, the application relates to systems and methods for connecting a pipe selected from a variety of different pipe sizes substantially without losing fluid flow.

It is known in the prior art to provide a drainage basin such as shown in FIG. 10, suitable for catching storm water or waste water and then distributing it to regions that can absorb the flow. It is also known to extract water that has run into such a basin, and to run it off to a different storage system, or to allow it to run onto a lawn, or garden, or other natural environment such as a golf course. (As used herein, the terms catch basin, drainage basin, drainage box, catch box, and similar terms are all used synonymously to describe a receptacle for collecting water before disposing of it.)

It is further known in the prior art to provide drainage basins with an attachable/removable connector piece 10' (FIGS. 4, 6, 10) in the form of an adaptor onto which a pipe of selected size may be attached for the purpose of leading off the water contained within the basin. Such a connector piece 10' may be inserted into a hole molded into the basin wall, and rotated about its elongate axis to secure it and draw it tight against the wall by means of helically oriented surfaces, in a known fashion.

It is yet further known to provide the connector piece 10' with two cylindrically shaped pipe receptors, a major pipe receptor 12' and a minor pipe receptor 14'—which may be selected for connection by the installer as needed. The major pipe receptor is typically capable of receiving a pipe having a diameter of about 4 inches, and the minor pipe receptor is typically capable for receiving a pipe having a diameter of about 3 inches. A received pipe slides into the bore of the pipe receptor, and the pipe is held within the receptor by frictional attachment. Internal ribs may be provided to enhance the frictional attachment. It will be appreciated that, for the purpose of installing a catch basin and extraction pipe in the earth, it is not necessary for such an attachment to be entirely waterproof, as the system is intended for use out of doors where the surrounding earth may well be saturated in any event.

Each pipe receptor 12' and 14' is typically attached to an annular flange 16'. Also attached to the flange 16' is a short insert pipe 18' which is sized to be inserted into a circular opening in a wall 6' of a catch basin 8' as may be envisaged with reference to FIG. 10. Attached at right angles to the insert pipe 18' is a set of teeth 22' (typically four in number), which have a helically sloped proximal surface. When the insert portion 18' and the teeth 22' are inserted into the wall in the catch basin, the connector piece 10' is rotated upon its elongate axis. The teeth then engage with the wall in known fashion, and draw the flange 16' into tight contact with the wall 6' of the catch basin 8'.

An installer of a catch basin 8' may then insert the catch basin in a hole dug into the earth, and when thus positioned, he may attach a selected pipe to either the major receptor 12' or to the minor receptor 14'.

One of the problems in the art facing an installer of such a catch basin and connector piece 10', is that if a pipe is connected to the major receptor 12', then the minor receptor 14' may present an obstacle to fluid flow through the pipe.

Accordingly, there is a need for a pipe connector piece that addresses the problems found in the art. The present invention addresses these and other needs.

SUMMARY OF THE INVENTION

In one embodiment, the invention is a pipe connector for use in conjunction with a catch basin. The pipe connector comprises an annular flange defining a central bore. It also includes a major pipe receptor defining a tube having a first diameter and being attached to the flange; and a minor pipe receptor defining a tube having a second diameter smaller than the first diameter, and being attached to the major pipe receptor by a frangible bridge that is configured to cleanly break when an impact load is applied to the minor pipe receptor, whereby the minor pipe receptor is removable from the major pipe receptor. In some embodiments, the frangible bridge defines an annular ring extending continuously around a circumferential surface of the minor pipe receptor. And in further embodiments, the annular ring defines a groove. The annular groove is specially configured to fracture upon the minor pipe receptor being given a sharp blow, to separate the minor receptor from the balance of the pipe connector without damaging any other portion of the balance of the pipe connector. In some embodiments, in order to accomplish this result, the frangible bridge has a minimum radial thickness which is between 0.02 inches and 0.04 inches. In some embodiments, the frangible bridge includes at least one buttress which has a radial thickness between 0.04 inches and 0.08 inches. Additionally, the at least one buttress has a circumferential dimension that is between 0.08 inches and 0.2 inches.

In another embodiment, the invention is a method of attaching a pipe to a catch basin. The method comprises providing a pipe connector defining a major pipe receptor in the form of a tube having a first diameter and further defining a minor pipe receptor in the form of a tube having a second diameter smaller than the first diameter. Then the minor pipe receptor is removed from the pipe connector. Upon such removal, the pipe connector is installed on a wall of a catch basin. Finally, a pipe is connected onto the major pipe receptor. In some embodiments, removing the minor pipe receptor includes applying an impact to the minor pipe receptor. Additionally, in embodiments, removing the minor pipe receptor includes breaking a frangible bridge that connects the minor pipe receptor to the major pipe receptor.

BRIEF DESCRIPTION OF THE DRAWINGS

FIG. 8 is a perspective sectional view of the pipe connector of FIG. 7, shown in a condition in which an internal feature has been removed.

FIG. 9 is a detail view of an aspect of the sectional view in FIG. 7, taken substantially from the region marked as "A" in FIG. 7.

DETAILED DESCRIPTION OF THE PREFERRED EMBODIMENTS

Figure 3:
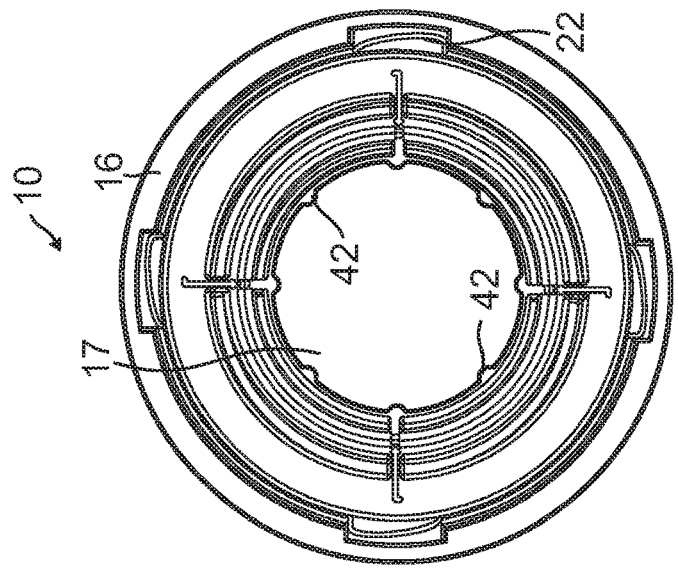
FIG. 3 is a back view of the pipe connector of FIG. 1.
Figure 2:
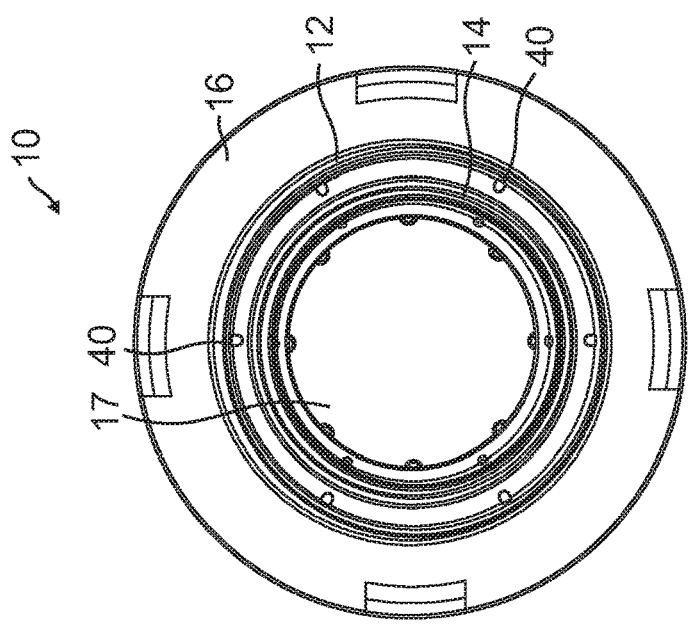
FIG. 2 is a front view of the pipe connector of FIG. 1.
Figure 1:
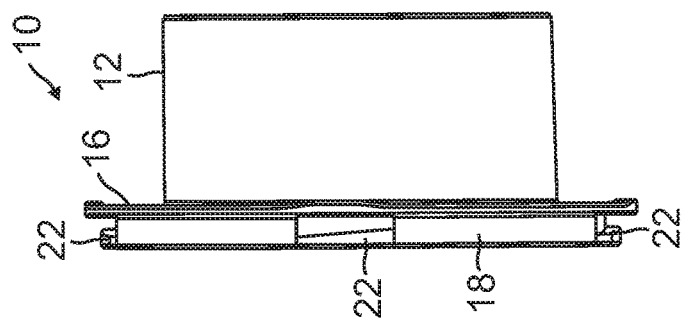
FIG. 1 is a side view of a pipe connector having features of an embodiment of the invention.
Figure 5:
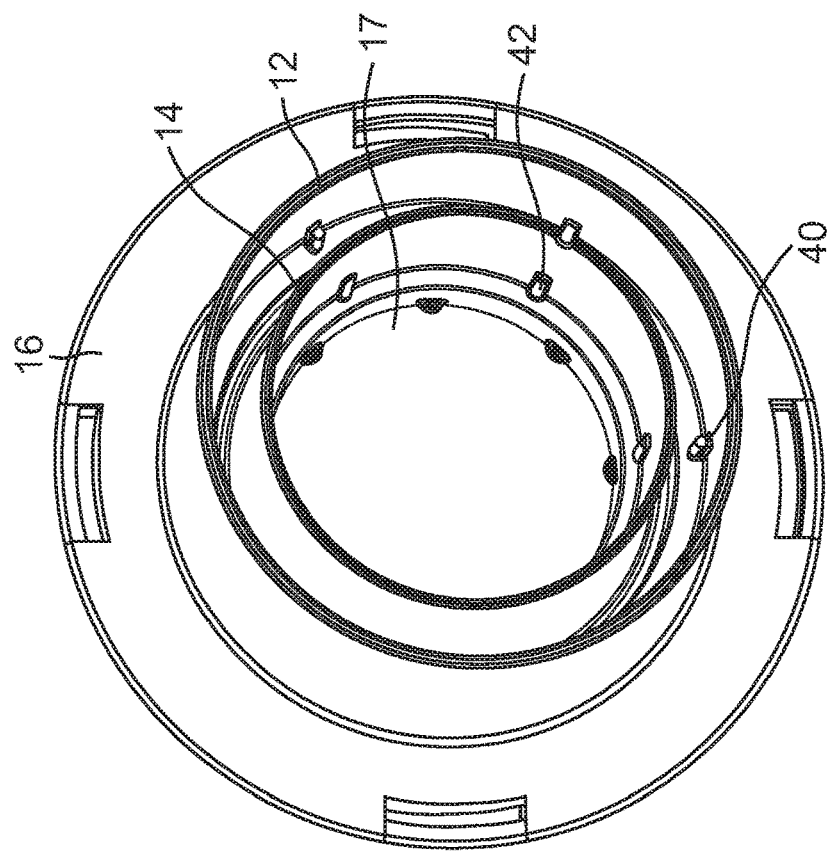
FIG. 5 is a perspective view of the pipe connector in FIGS. 1-3.

In an embodiment described herein, as more fully understood when read in conjunction with the figures, the present invention addresses shortcomings in the art. The invention comprises a pipe connector 10 suitable for attaching to a drainage box so as to provide an adaptive connector for attaching an outflow pipe. Preferably, the connector 10 is molded according to known technique from a polymer material suitable for the purpose.

With reference to FIGS. 1-3, and FIG. 5 the connector 10 comprises a flange 16 in the form of a circular annulus defining a bore, and having a flat surface configured to be drawn tightly against a wall of a drainage box in a fashion that is known in the art.

Attached to the flange 16 are two receptors for receiving a single pipe to be connected to the drainage box: a major receptor 12 and a minor receptor 14. Each receptor is in the form of a short hollow tube, suitable in some embodiments for an outlet pipe to be installed against the inside surface of the receptor, and also in some other embodiments for a pipe to be installed against the outside surface of the receptor. In the embodiment shown in the figures, the major receptor 12 may be sized to receive on its inside surface a pipe having a diameter of about 4 inches and the minor receptor may be sized to receive on its inside surface a pipe having a diameter of about 3 inches. These sizes are examples, and are not a limitation on the invention. The minor receptor 14 is positioned inside the major receptor 12, and the two receptors are co-axially aligned with each other. The resulting pipe connector 10 defines a bore 17 that extends axially through the pipe connector for permitting fluid flow between a drainage box such as the box 8' shown in FIG. 10, and a pipe (not shown in FIG. 10) that is connected to the pipe connector.

Figure 7:
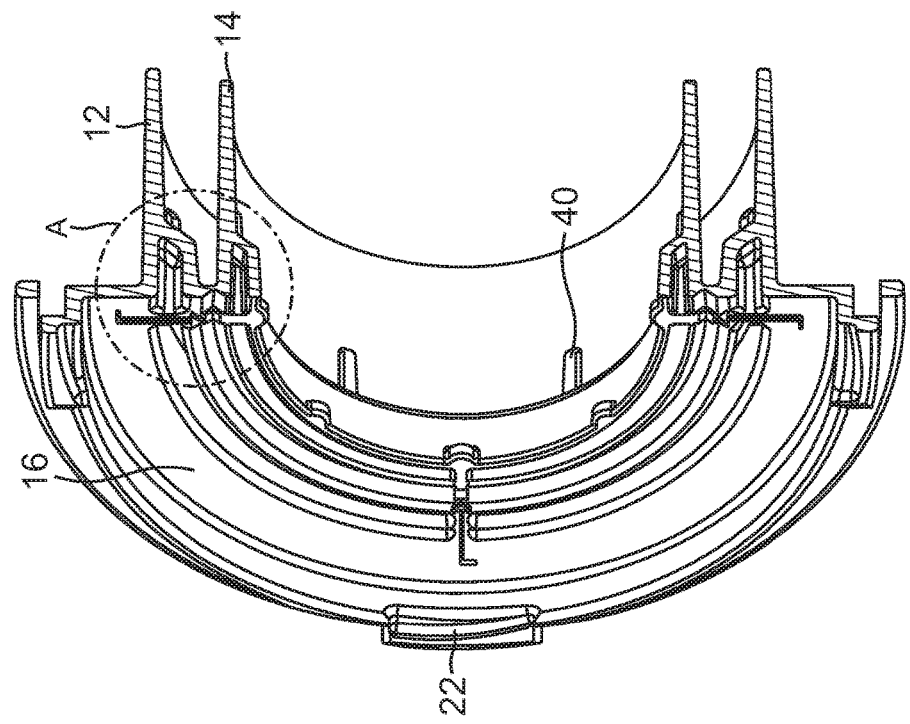
FIG. 7 is a perspective sectional view of the pipe connector of FIG. 5.

With reference to FIG. 7 and FIG. 9, at the base of the two pipe receptors 12, 14 where they are attached to the flange 16, the receptors are thickened to accommodate greater bending moments that will tend to occur at those locations. In order to facilitate manufacture of these thickened portions by molding, each base is divided into two feet, namely 12a and 12b, and 14a and 14b respectively. A hollow space 12c, separates the feet 12a and 12b from each other and a hollow space 14c separates feet 14a and 14b from each other. The space allows for a superior molding process because it reduces weight, improves cooling of the molded material, and reduces warping and bubbling during molding and mold removal. In some embodiments, a plurality of stiffeners 24 may be provided to extend through the space 12c in order to connect the feet 12a and 12b at points (in some embodiments four points) around the circumference; and a plurality of stiffeners 26 may be provided to similarly connect the feet 14a and 14b. These stiffeners provide stability to the feet during the molding process.

Additionally, as is shown in the figures, internal ribs 40 may be provided on the internal surface of the major receptor 12 and internal ribs 42 may be provided on the minor receptor 14. These ribs are provided in order to allow pipes that vary slightly in size to be used in conjunction with the pipe receptors 12, 14. The ribs operate in such a way that if a pipe is inserted into the bore of one of the receptors 12, 14 but happens to be slightly smaller than the inside diameter of the receptor, then the installer may force the pipe towards the flange 16 so that it becomes engaged by the ribs. This effect will be described in greater detail below.

Figure 10:
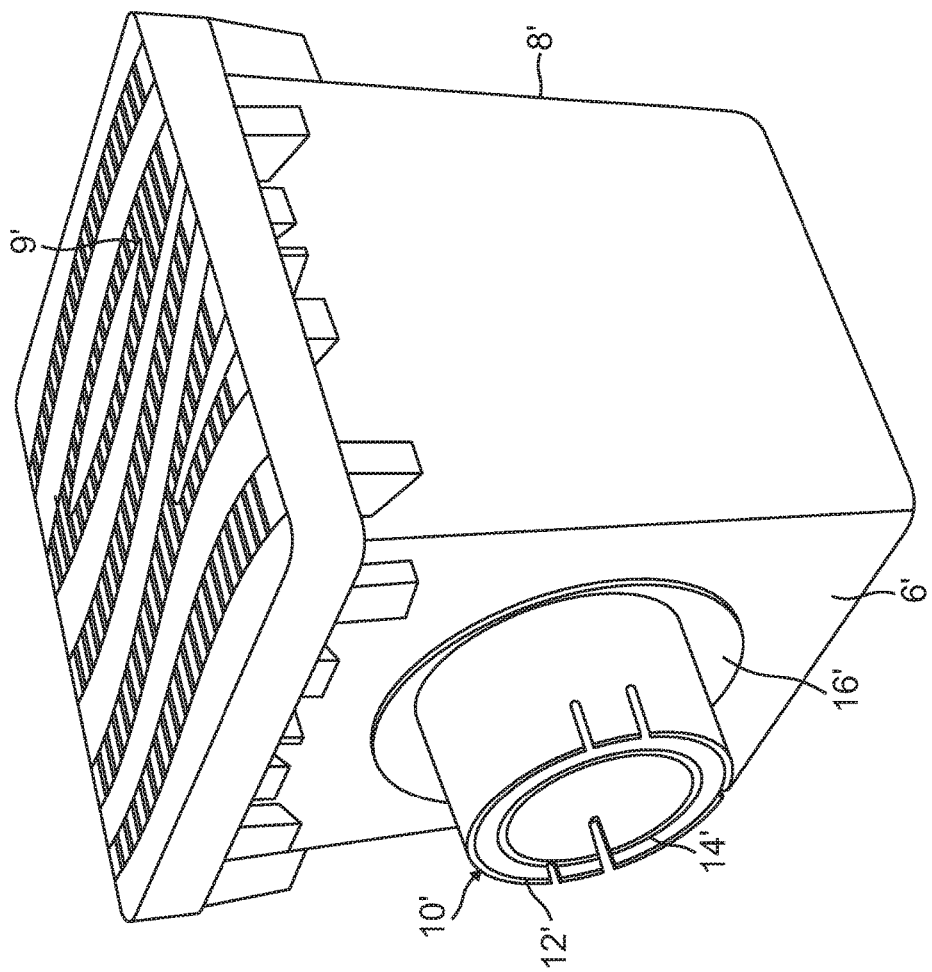
FIG. 10 is a perspective view of a pipe connector, such as is known in the art, installed on a known drainage box.

Further, as may be understood as shown in the figures, attached to the flange 16 is a short insert pipe 18 which is sized to be inserted into a circular opening in a wall of a catch basin 8' of the kind shown in FIG. 10. Attached at right angles to the insert pipe 18 is a set of teeth 22 (preferably four in number), which have a helically sloped proximal surface. When the insert pipe 18 and the teeth 22 are inserted into the wall in the catch basin, the connector piece 10 is rotated upon its elongate axis. The teeth then engage with the wall in known fashion, and draw the flange 16 into tight contact with the wall of the catch basin.

Figure 16:
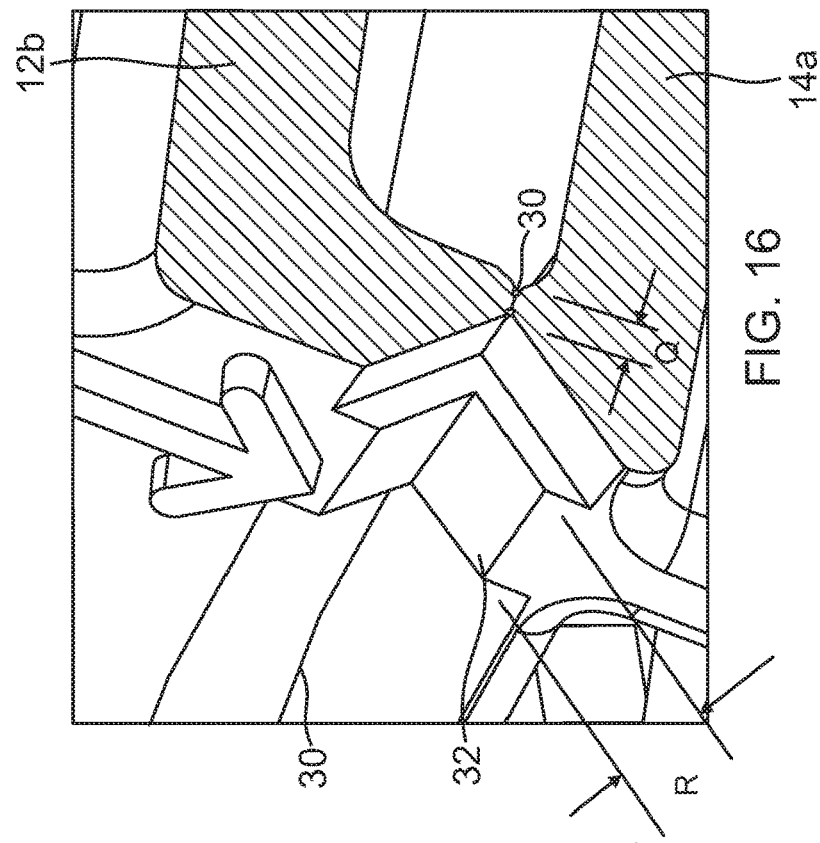
FIG. 16 is an expanded view of the detail view of FIG. 9.

An important feature of the invention is a frangible bridge 30 that extends between adjacent feet of the major pipe receptor 12 and the minor pipe receptor 13. In some embodiments, as exemplified in the figures, the bridge 30 extends circumferentially in a continuous ring, to connect the major pipe receptor to the minor pipe receptor. However, in other embodiments discontinuities may be included so that the bridge comprises a series of intermittent connections. As best shown in FIG. 9, the foot 12b of the major receptor 12 is adjacent to the foot 14a of the minor receptor 14. In the exemplary embodiment shown, a continuous frangible bridge 30 of molded polymer material connects foot 12b to foot 14a. The dimensions of this bridge 30 are selected to satisfy two conditions. The first condition is that the bridge 30 must be thick enough to prevent it being accidentally fractured during normal installation steps. The second condition is that the bridge 30 must be thin enough to fracture upon an installer knock out the minor receptor 14 from its attachment to the connector 10, without using too much effort and without damaging the remaining portions of the connector 10. Preferably, the bridge 30 is characterized by a radially outwardly opening annular groove, or "V" shape in an illustrative embodiment as suggested in FIG. 9, with a sharp notch to induce fracture around the circumference of the minor receptor 14 when a blow is delivered to the minor receptor, while leaving the balance of the connector undamaged. In one embodiment, the preferred thickness "Q" (as seen in FIG. 16) of the frangible bridge 30 is between 0.02 inches and 0.04 inches.

Figure 15:
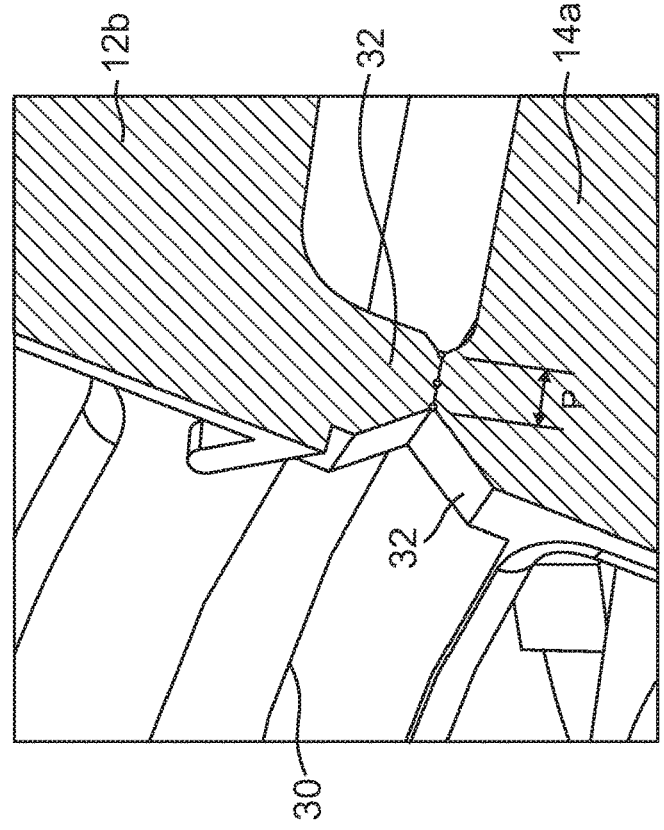
FIG. 15 is an expanded view of the detail view of FIG. 9, in which a section is taken on a different plane.

FIG. 8 shows a connector 10 (in section) from which the minor receptor 14 has been knocked out and removed. Such removal may be achieved by a hammer blow, or a similar impact load. In some embodiments, the bridge 30 may be reinforced with a plurality of short buttresses 32. A buttress 32 comprises a thickening of the bridge 30 over a relatively short circumferential length. In some embodiments, as best understood with reference to FIGS. 15-16 the length of the buttresses "R" may be between 0.1 inches and 0.2 inches and the thickening of the bridge "P" may be between 0.04 inches and 0.08 inches. In some embodiments, the number of buttresses 32 equals the number of bridges 24, 26, and these may be located at the same positions as the bridges. The buttresses 32 are included to strengthen the bridge 30 locally so as to prevent it from being accidentally broken off during installation, but also include a "V" shape with a sharp notch to induce fracture when a blow is delivered for intentional removal from the connector.

Figure 4:
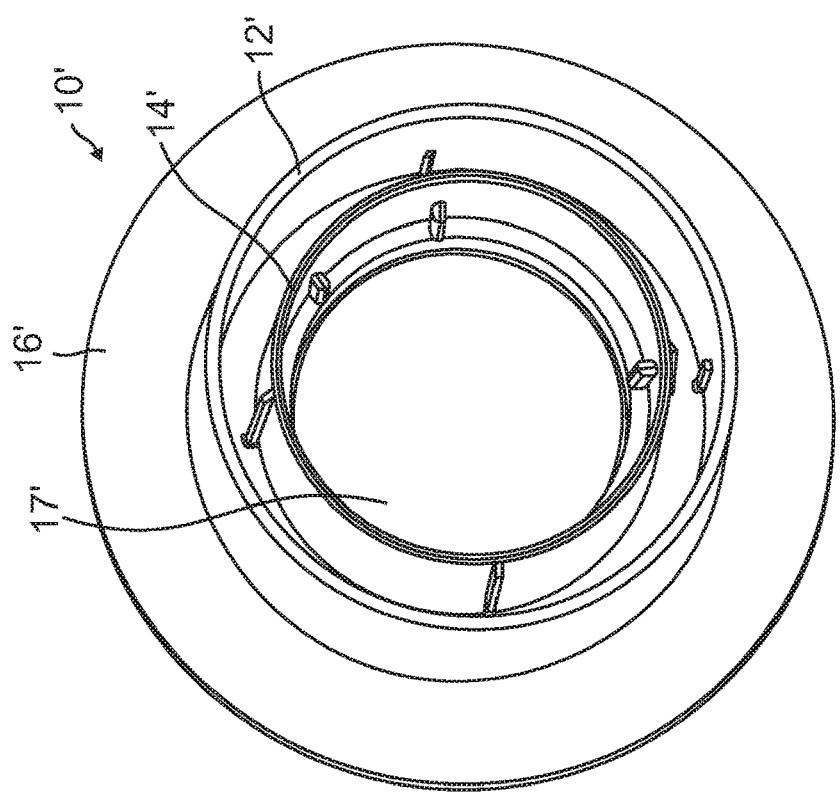
FIG. 4 is a perspective view of a pipe connector that is known in the prior art.
Figure 6:
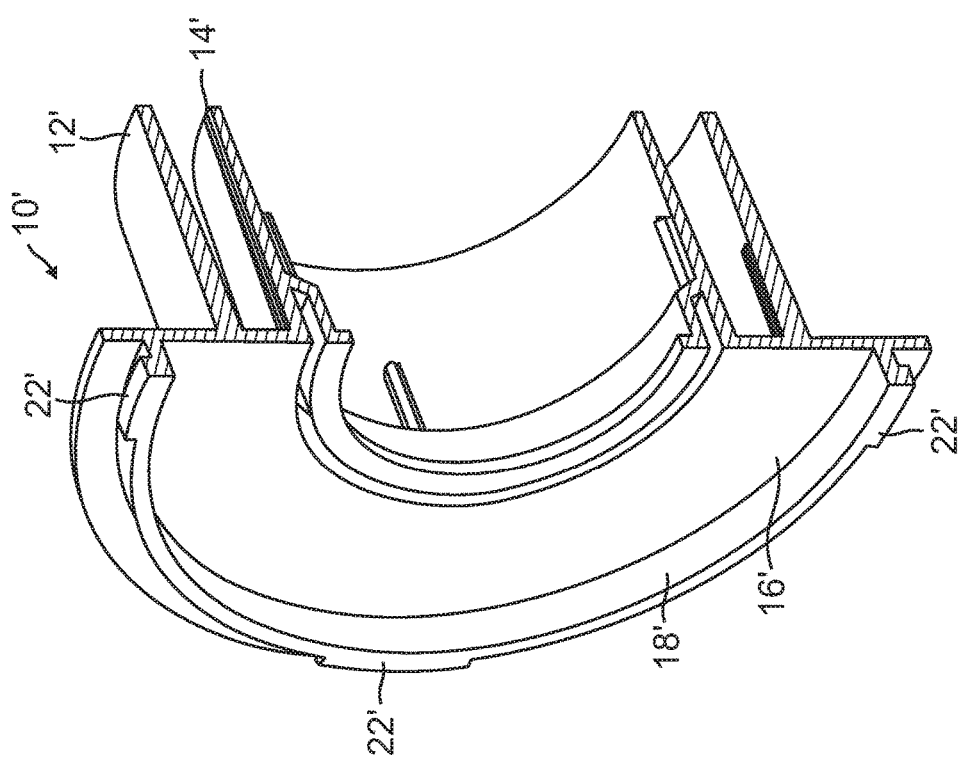
FIG. 6 is a perspective sectional view of the pipe connector of FIG. 4.

An advantage provided by the removability of the minor receptor 14 from the connector 10 is that, once the minor receptor is removed, a pipe connected to the major receptor 12 will experience a fuller fluid flow through the bore 17. It will be appreciated that the removal of the minor receptor 14 significantly increases the flow through the major receptor 12 in cases where a pipe has been selected having a size for connection to the major receptor 12. As shown in FIGS. 4 and 6, the prior art does not disclose or suggest a minor receptor that is designed to be removable. Rather, it teaches a structure that necessarily results in reduction in fluid flow in the case where a major receptor is selected for connection to a pipe.

And yet, the invention is flexible enough to allow the installer, where desirable in certain situations, to elect not to remove the minor receptor 14 even if he is attaching a pipe to the major receptor 12. This will be explained with reference to FIGS. 11-14 where there will be described a series of alternative uses that the invention advantageously permits.

Figure 11:
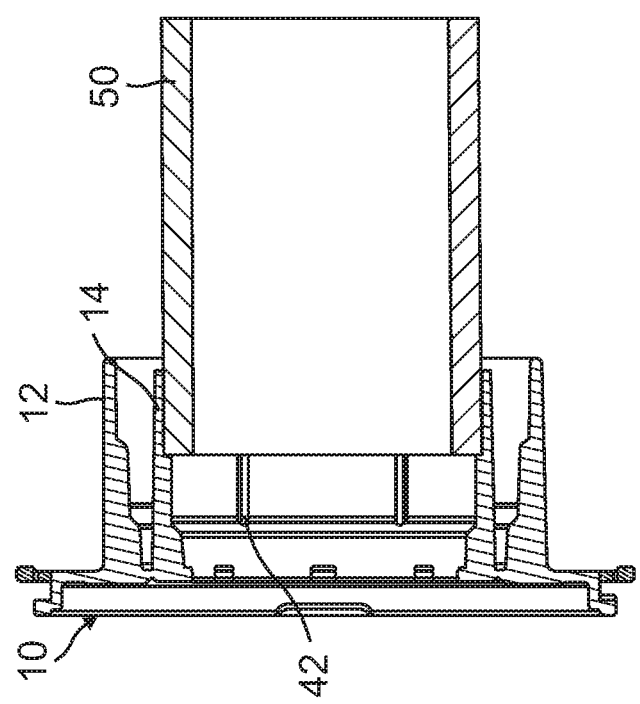
FIG. 11 is a sectional view of the pipe connector of FIGS. 1-3 showing a connection to a 3 inch pipe.
Figure 13:
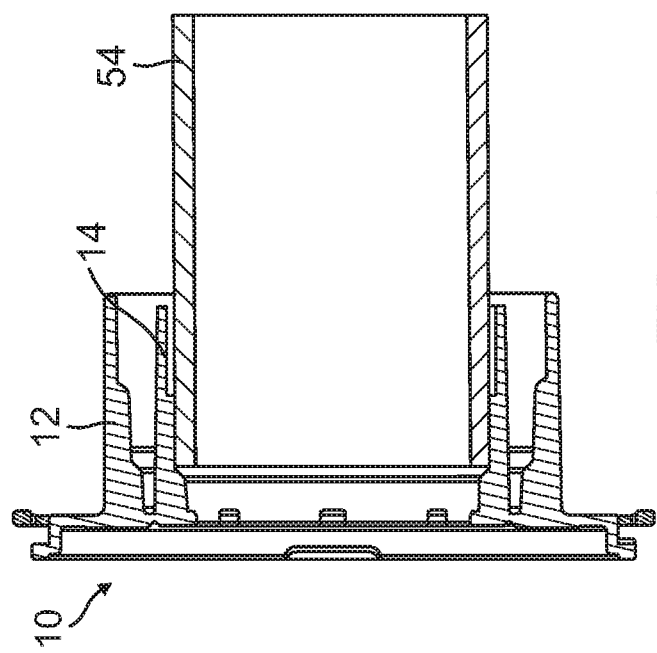
FIG. 13 is a sectional view of the pipe connector of FIGS. 1-3 showing a connection to a 3 inch pipe of a different shape than in FIG. 11.

Turning now to alternative uses that the invention advantageously permits, FIG. 11 shows a pipe 50 that is inserted into the bore of the minor receptor 14. The pipe may have an outside diameter that fits snugly into the inside diameter of the minor receptor 14. When the pipe reaches the rib 42 its travel into the bore may be stopped by the rib 42. By contrast, FIG. 13 shows a pipe 54 inserted into the bore of the minor receptor, but pipe 54 has a slightly smaller outside diameter than pipe 50 shown in FIG. 11. In this case, the pipe is pushed into the bore of the minor receptor and beyond the ribs 42. In fact, the ribs 42 will provide a gripping action to frictionally hold the pipe 54 during installation of the entire assembly in the earth. It will be appreciated that the resulting connection may not be water tight, but that is typically not a requirement for water drainage boxes installed in the earth out of doors.

Figure 12:
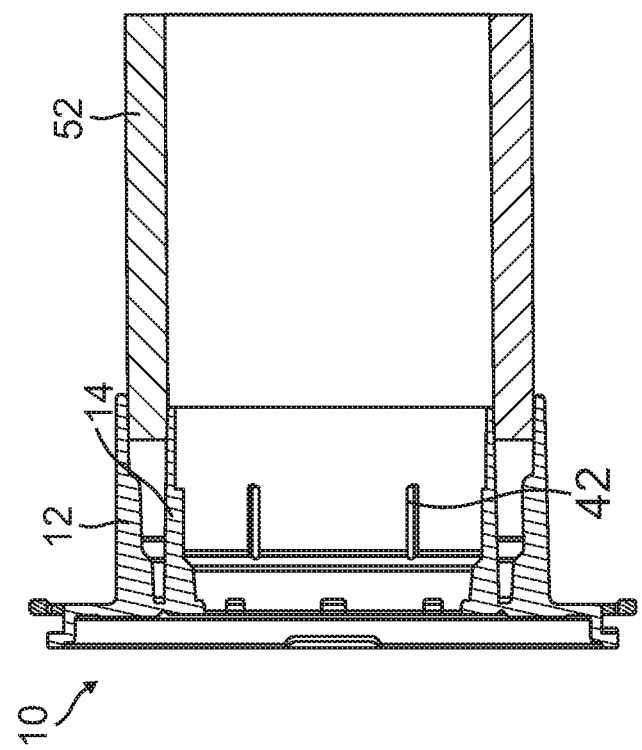
FIG. 12. is a sectional view of the pipe connector of FIGS. 1-3 showing a connection to a 4 inch pipe.
Figure 14:
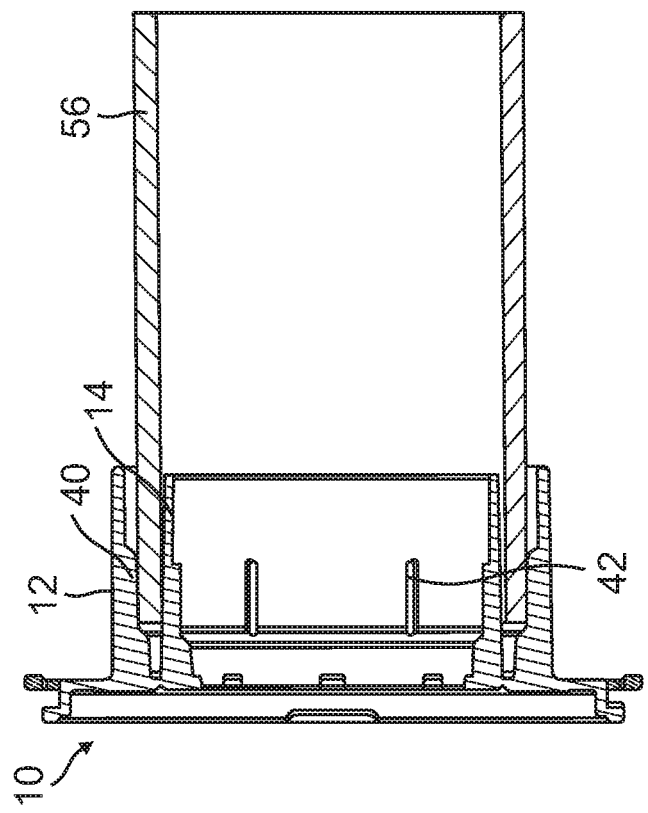
FIG. 14. is a sectional view of the pipe connector of FIGS. 1-3 showing a connection to a 4 inch pipe of a different shape than in FIG. 12.

By further contrast, FIG. 12 shows a pipe 52 inserted into the bore of the major receptor 12. In this case, the pipe 52 has a relatively great wall thickness, and it may be corrugated or have similar expanded structure, so that the pipe does not have significant rigidity. In this case, it may suit the installer to leave the minor receptor 12 intact within the adapter 10, so that the pipe 52 may gain support from the inner wall of the major receptor 12 and also from the outer wall of the minor receptor 14. On the other hand, it may suit the installer to remove the minor receptor 14, in cases where an enhanced flow rate is more importantly desired. Thus, the knock out feature of the invention presents the installer with a number of advantageous features providing flexibility and utility. Finally, FIG. 14 shows a pipe 56 inserted into the bore of the major receptor 12. Pipe 56 has a smaller wall thickness and also has a slightly smaller outside diameter than pipe 52 shown in FIG. 12. Consequently, pipe 56 is pushed beyond the ribs 40 of the major receptor 12, and gains support from these ribs. However, it gains no support from the outer surface of the minor receptor 14. Consequently, in this case, the installer might well elect to knock out the minor receptor 14 to create a full flow bore leading through the pipe 56.

Thus, the various embodiments of the invention provides an advantageous and flexible structure for connecting pipes to a drainage box, and addresses problems found in the prior art. The present invention may, of course, be carried out in other specific ways than those herein set forth without departing from the essential characteristics of the invention. The present embodiments are, therefore, to be considered in all respects as illustrative and not restrictive, while the scope of the invention is set forth in the claims that follow.

I claim:

1. A pipe connector for use in conjunction with a catch basin, the pipe connector comprising:
   an annular flange defining a central bore;
   a major pipe receptor defining a tube having a first diameter and being attached to the flange, the major pipe receptor having a first foot and a second foot extending from the annular flange wherein the first foot and the second foot have a thickness greater than a thickness of the major pipe receptor;
   a minor pipe receptor defining a tube having a second diameter smaller than the first diameter, the minor pipe receptor having a first foot and a second foot extending from the annular flange wherein the first foot and the second foot have a thickness greater than a thickness of the minor pipe receptor, the minor pipe receptor being attached to the major pipe receptor by a frangible bridge that is configured to cleanly break when an impact load is applied to the minor pipe receptor, whereby the minor pipe receptor is removable from the major pipe receptor.

2. The pipe connector of claim 1, wherein the frangible bridge defines an annular ring extending continuously around a circumferential surface of the minor pipe receptor.

3. The pipe connector of claim 2, wherein the annular ring defines a groove.

4. The pipe connector of claim 1, wherein the frangible bridge has a minimum radial thickness which is between 0.02 inches and 0.04 inches.

5. The pipe connector of claim 4, wherein the frangible bridge includes at least one buttress which has a radial thickness between 0.04 inches and 0.08 inches.

6. The pipe connector of claim 5, wherein the at least one buttress has a circumferential dimension that is between 0.08 inches and 0.2 inches.

7. A method of attaching a pipe to a catch basin comprising:
   providing a pipe connector defining a major pipe receptor in the form of a tube having a first diameter and further defining a minor pipe receptor in the form of a tube having a second diameter smaller than the first diameter;
   increasing the bending moments of the major pipe receptor and the minor pipe receptor by increasing a thickness of a base on each of the major pipe receptor and the minor pipe receptor where the respective bases are attached to a frangible bridge;
   removing the minor pipe receptor from the pipe connector;
   installing the pipe connector on a wall of a catch basin; and
   connecting a pipe onto the major pipe receptor.

8. The method of claim 7, wherein removing the minor pipe receptor includes applying an impact to the minor pipe receptor.

9. The method of claim 7, wherein removing the minor pipe receptor includes breaking the frangible bridge that connects the minor pipe receptor to the major pipe receptor.

10. The pipe connector of claim 1, wherein the frangible bridge is formed from a polymer material.

11. The pipe connector of claim 1, wherein the frangible bridge includes a V-shaped annual groove to facilitate fracturing around the circumference of the minor pipe receptor.

\* \* \* \* \*